(12) United States Patent
Macknis

(10) Patent No.: US 8,093,552 B2
(45) Date of Patent: Jan. 10, 2012

(54) ELECTRIC FIELD SEPARATOR DEVICE AND PROCESS

(76) Inventor: John Macknis, Yardley, PA (US)

( * ) Notice: Subject to any disclaimer, the term of this patent is extended or adjusted under 35 U.S.C. 154(b) by 282 days.

(21) Appl. No.: 12/455,649

(22) Filed: Jun. 4, 2009

(65) Prior Publication Data

US 2009/0302212 A1 Dec. 10, 2009

Related U.S. Application Data

(60) Provisional application No. 61/130,772, filed on Jun. 4, 2008.

(51) Int. Cl.
H01J 49/42 (2006.01)

(52) U.S. Cl. .................................. 250/286; 250/396 R

(58) Field of Classification Search ............... 250/396 R, 250/423 R, 424, 281, 282, 288, 286
See application file for complete search history.

(56) References Cited

U.S. PATENT DOCUMENTS 7,274,015 B2 * 9/2007 Miller et al. ................... 250/288

* cited by examiner

*Primary Examiner* — Kiet Nguyen

(57) ABSTRACT

A process and device is provided for the separation of electronegative molecules from non electronegative molecules using electric fields. The molecules are ionized in a non thermal discharge plasma which produces negative and positive ions of the electronegative and non electronegative molecules. The ions are spatially separated by an average DC electric field. A means to filter is disposed in the path of the separated ions and it allows ions to pass through more easily than uncharged molecules. After the ions pass through the filter they are electrically neutralized back to uncharged molecules.

7 Claims, 4 Drawing Sheets

ELECTRIC FIELD SEPARATOR DEVICE AND PROCESS

CLAIM OF THE BENEFIT OF PROVISIONAL APPLICATION

This application claims the benefit of U.S. Provisional application Ser. No. 61/130,772, filed on Jun. 4, 2008, which is incorporated herein by reference in its entirety.

BACKGROUND OF THE INVENTION

1. Field of the invention

This device and process relate to the field of fluids separation and more particularly to separation of electronegative molecules from non electronegative molecules using electric fields. One of the most useful electronegative molecules is oxygen, O2. In the atmosphere, it is mixed with primarily non electronegative molecules.

2. Background information

Many important environmental, chemical, medical, and electronics technologies require pure oxygen. For example, it is used in clean coal combustion technologies to produce gasification of coal. It is also used in CO2 reduction as oxygen fuel combustion to produce a concentrated stream of CO2 for sequestration.

The high cost of high purity oxygen has negatively impacted many applications because it is largely produced by cryogenic air separation, where air is cooled down to the condensation point of nitrogen (−210 C). The components are then separated in large columns. This process requires expensive, maintenance intensive equipment, with high energy consumption.

Another method of gas separation is the use of selective membranes which pass only desired components. Mixed Ionic Electronic Conducting Membranes rely on transport of oxide ions (O——) through the membrane to separate oxygen from air. The process has low throughput and requires high temperatures for the ion conduction to take place. The reaction is driven by a high pressure differential across the membrane or the reaction can be driven by an external electric circuit known as active oxygen pumping. Hydroxide conductive membranes rely on the transport of hydroxide ions (OH—) through the membrane and require a high pressure differential or an external electric circuit.

A fuel cell can also be used to separate gases such as oxygen or hydrogen by supplying a mixture of gases to one electrode with a potential difference to a counter electrode separated by a polymeric ion exchange electrolyte. The hydrogen or oxygen may be generated by the decomposition of water or may be transported through the electrolyte in ionic form, depending upon whether a polymeric cation or anion exchange electrolyte is employed.

All these methods require high energy input through compression or electric power, which requires at least one electron, from an external circuit, for each molecule separated.

Therefore, there exists a need to produce high purity oxygen in a more efficient manner with less complex and more compact equipment.

SUMMARY OF THE INVENTION

This invention fills that need with an efficient, compact system, which does not require high pressure equipment.

Separation between substances requires that there is a difference between their physical characteristics, which will allow a process to segregate the substances. The greater the difference, the easier the separation process.

Some gases have the ability to lose an electron with very little energy input and some gases have the ability to capture a free electron (electronegativity). Loss of an electron produces a positive ion and the capture of an electron results in a negative ion.

Once a mixture of gases contains negative and positive ions, they can be subject to opposite forces in an electric field. The negative ions will be attracted to the positive side of an electric field and the positive ions will be attracted to the negative side of an electric field.

This process ionizes different molecules with opposite polarity, and then separates them using electric fields. The charges are then neutralized between them, using mainly the charges from the original ionized molecules, before they reach the electric field electrodes. This cancels each other out, and requires low energy input.

The process of separating electronegative molecules from non electronegative molecules in a mixture of molecules is comprised of providing a first electric field established by an alternating electrical potential, and bringing the said mixture of molecules into the said first electric field, producing a non thermal plasma of the molecules which produces negative and positive ions of the electronegative and non electronegative molecules, and providing a second electric field by an average direct current electrical potential, which is in a transverse direction to the said first electric field and enclosing the same volume as the said first electric field, which attracts negative ions in one direction and positive ions in the opposite direction, and spatially separating the negative and positive ions and wherein the electronegative molecules in the said mixture of molecules is oxygen and wherein some of the negative ions release their excess electron charges after they are spatially separated from the positive ions and those electron charges then neutralize the positive ions to form neutral molecules which are spatially separated and wherein a means to filter allows spatially separated ions to pass through it more easily than neutral molecules.

The process described herein is to efficiently produce a high strength electric field which produces an avalanche of electrons by accelerating initial electrons near the negative side towards the positive side of the electric field. The electrons are accelerated by the field and collide with molecules located within the field to produce positive ions and more electrons to collide with more molecules, over many iterations and leads to an avalanche of electrons and an equal number of positive ions. This does not produce a high energy spark because the multiplication is limited to 5 to 6 orders of magnitude through use of a dielectric between the electrodes and through the use of an alternating current (AC) between the electrodes. This is known as a non thermal discharge because most of the energy accelerates the molecules with very little heat. The current reverses in polarity to slow the electrons and cause them to reverse direction and begin the process in the opposite direction. When the electrons are slowed, they can be captured by electronegative molecules, which become negative ions.

The summation of the electrons, negative ions, and positive ions would balance out to an almost electrically neutral mixture before they land on the electrodes. At this point the process separates the ions through the use of an electric field which is in a transverse direction to, or almost perpendicular across the AC field direction and has a DC (direct current) component, which means that, on average, the waveform would contain direct current and its electric field is mainly biased with a positive electrode on one side and a negative on the opposite side.

The negative ions migrate in the DC field direction toward the positive side, and the positive ions migrate towards the negative side. As they leave the area of the AC field, the process passes them through a filter and they are then drawn to equalization plates or grids.

One set of equalization plates is located near the negative DC field source and they are electrically connected to each other and also electrically connected to another set of equalization plates located near the positive DC field source. As a negative ion contacts an equalization plate, it gives up an electron and becomes electrically neutral. As a positive ion, on the opposite side, contacts an equalization plate, it gains an electron and becomes electrically neutral. The given up electrons travel through an electrical connection between the equalization plates and become the gained electrons. This results in a current flow through the equalization circuits, which returns the charges to the original ionized molecules, converts them back to non ionized molecules, and results in an energy efficient process. A voltage potential difference may be maintained between the equalization plates or grids by an external source.

This device provides a means to ionize different molecules with opposite polarity, and then a means to separate them, and then a means to neutralize the charges between them, using mainly the charges from the original ionized molecules, before they reach the ionizing electrodes, to cancel each other out, which requires low energy input.

The means to ionize different molecules with opposite polarity can be accomplished by using a dielectric barrier discharge or non thermal discharge contained within an elongate container with an input end and a discharge end.

The complete separating device comprises an elongate outer housing which contains a flow of a mixture of electronegative and non electronegative molecules, an alternating electric potential source which is connected to a first set of electrodes which are contained on the said elongate outer housing and produce a volume of non thermal discharge within a portion of the said elongate outer housing, and an average direct current potential source which is connected to a second set of electrodes which produce an electric field that is transverse or across the electric field produced by the said first set of electrodes, and a means to control both electric fields so the non thermal discharge field ionizes part of the said mixture of electronegative and non electronegative molecules into positive and negative ions which then migrate in opposite directions towards the said second set of electrodes producing spatial separation of the positive and negative ions and charges, and a set of conducting equalization plates or grids which are disposed in the path of the separated positive and negative ions and are electrically interconnected to allow a flow of electrons between the positive and negative ions, which neutralizes them and reverts them back to uncharged molecules and a means to filter disposed in the path of the separated ions and it allows ions to pass through more easily than uncharged molecules.

BRIEF DESCRIPTION OF THE DRAWINGS

The above and other features of this invention will become readily apparent from a reading of the following detailed description of various aspects of the invention taken in conjunction with the following drawings.

DETAILED DESCRIPTION OF THE INVENTION

Figure 1:
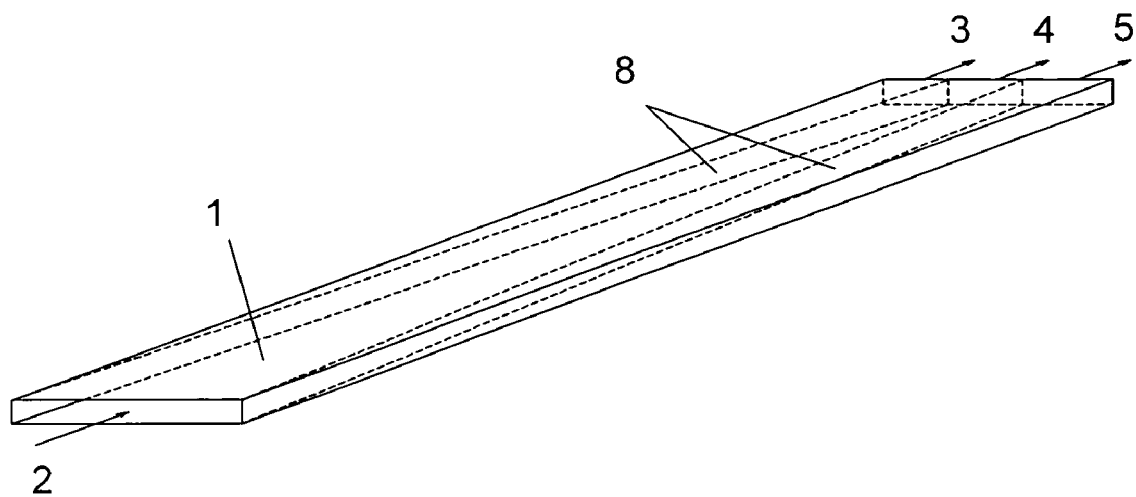
FIG. 1 is a perspective view of an elongate container for the flow path of the gases.
Figure 2:
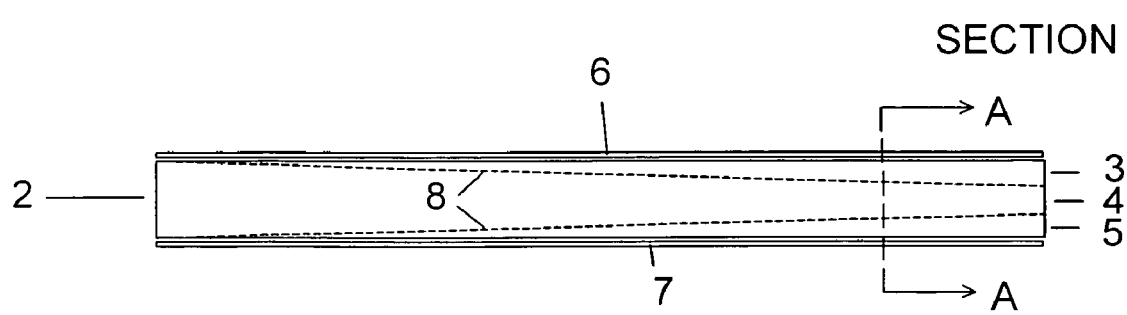
FIG. 2 is a plan view of the elongate container with a section view taken.
Figure 3:
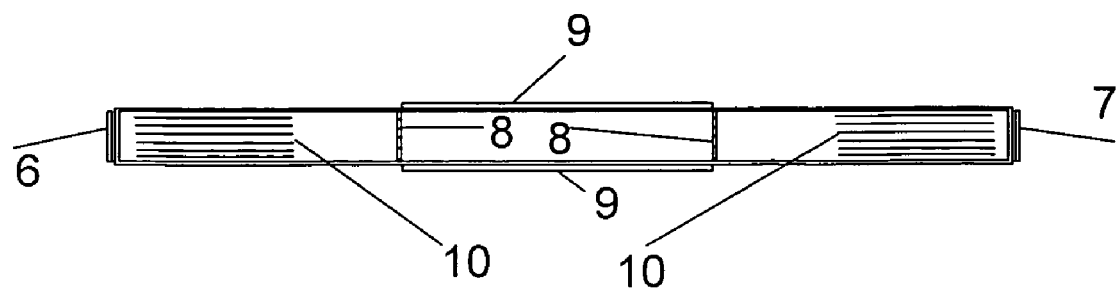
FIG. 3 is the section view from FIG. 2.
Figure 4:
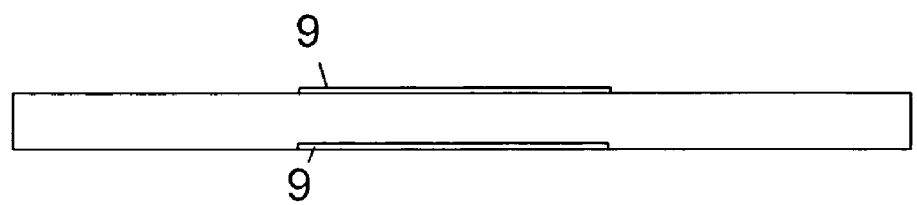
FIG. 4 is an alternate arrangement of AC electrodes.
Figure 5:
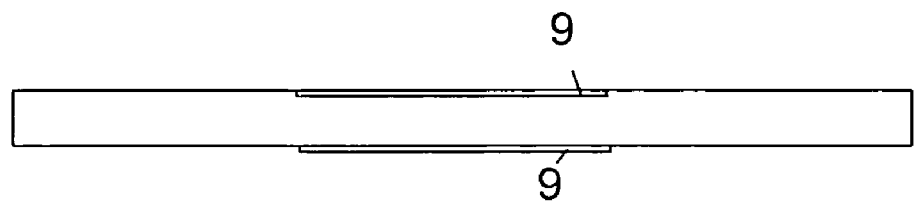
FIG. 5 is another alternate arrangement of AC electrodes

Referring to FIG. 1, the elongate outer housing is designated as 1. The inlet 2, admits the mixture of gases, which are propelled through the separator by a fan, which is not shown. The outlet 3, exits the neutralized electronegative gas. Outlet 5, exits the non electronegative gas, and outlet 4 exits the mixture of gases minus the outlet 3 and outlet 5 flows. The filters are shown as 8 and the space between the filters contains the dielectric barrier discharge AC electrodes 9, as shown on FIG. 3, outside the dielectric enclosure. Also shown in FIG. 3, which is a section view, are the positive DC electrode 6, the negative DC electrode 7, the ion equalization plates 10, and the filters 8. Alternate arrangements of the AC electrodes are shown on FIG. 4 and FIG. 5 where one electrode is within the dielectric enclosure.

Figure 6:
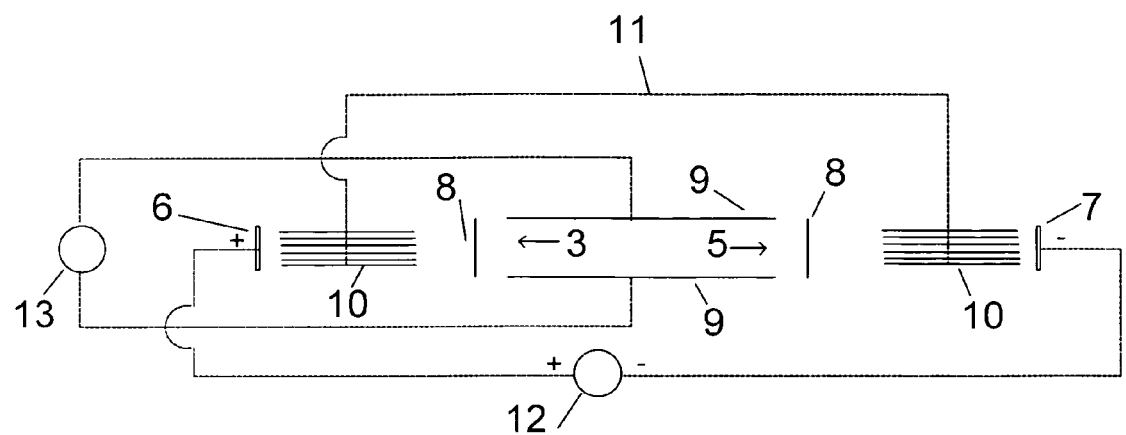
FIG. 6 is a view of the components, except for the elongate container, in the section view.

The AC voltage source circuit is shown as 13, in FIG. 6, which is also a section view but does not show the outer housing, 1, for the sake of clarity. Included with 13, are the electrical connections from the generator to the AC electrodes, shown as dashed lines and are outside the housing 1. The volume between the AC electrodes, 9, is where the dielectric barrier or non thermal discharges take place. For a given density of gases and electrode spacing, the energy of the discharges are controlled by the voltage from the source and by the frequency of the AC. The discharges are the result of the multiplication and acceleration of electrons from the molecules.

As the dislodged electrons are accelerated in the AC field during one half cycle, they collide with molecules. Higher energy electrons can produce broken molecules, which result in different atomic combinations and radicals. Lower energy electrons can produce positive ions by dislodging electrons to add to the avalanche between the electrodes, which is preferred. Other applications of non thermal discharges produce chemical reactions between plasma components, which are not required in this device.

As the polarity of the AC source changes during the next one half cycle, the direction of the acceleration is reversed and the ions flow in the opposite direction.

The dynamics of the dielectric barrier discharge are well documented for various gases and densities. At atmospheric pressure and normal ambient temperatures, the mixture of the gases in air will be used as an example of the separation process.

Oxygen is an electronegative gas and is found at a concentration of approximately 21% in air. Nitrogen is a non electronegative gas and is found at a concentration of approximately 79% in air. The trace gases will be omitted in this example.

Both gases can be ionized to form positive ions when an electron is knocked off a neutral molecule. The energy required to ionize each is known as the ionization potential. Oxygen requires approximately 13.5 ev (electron volts) and nitrogen requires approximately 14.5 ev. An electron accelerated through a potential difference of 1 volt increases its energy by 1 ev.

Only oxygen will capture a free electron to form a negative ion. The energy to capture its first electron in known as the first electron affinity and is approximately 1.5 ev. increase.

A typical dielectric discharge barrier can have an air gap of 1 mm and a dielectric thickness of 0.5 mm. The AC voltage applied can be 7 kv, with a frequency of 20 kHZ. Streamers will be produced in certain areas of the discharge space. Streamers are local ionization waves usually moving from anode to cathode to meet avalanches propagating in opposite directions. Avalanches are an exponential increase in electrons as ionization of molecules produces free electrons which are accelerated by an electric field to ionize more molecules and produce more electrons. FIG. 6 shows the space between AC electrodes, where the dielectric barriers are placed, and where the discharges occur.

The discharges can occur at a density of 60 discharges per cm2, with a discharge radius of 0.2 mm each. The electron density in the discharge can be $10^{14}$ per cc. Discharges can be produced for each half cycle of the AC voltage, or more often for certain arrangements.

The mobility of the ions produced in the gap can be approximately $2\times10^{-4}$ meters per volt second for positive ions and approximately $2.7\times10^{-4}$ meters per volt second for negative ions. Electron mobility is a function of electric field strength and is approximately $4\times10^{-2}$ meters per volt second in this field, which means that the electrons move 200 times faster than the ions in an electric field. This is the basis of the streamers and avalanches which form the discharges.

The means to separate the ionized gases can be accomplished with a DC electric field in a transverse direction from the AC field. The DC voltage source is shown as 12 in FIG. 6. Included with 12, are the electrical connections from the generator to the DC electrodes, shown as dashed lines which are outside the housing 1. The electrode for the DC average positive electrode is shown as 6, and the electrode for the DC average negative electrode is shown as 7. This electric field can be a constant DC field, or it can be a DC field on average, but can employ AC cycles to control the direction and energy of the electrons and ions produced during an avalanche and discharge, as shown in B waveforms of FIGS. 7, 8, and 9.

In this example, the electrons move 200 times faster than the ions, so they can be manipulated back and forth across the volume of the discharge before the ions change position appreciably. This is to allow capture of the electrons by the electronegative gas, such as oxygen, to form negative ions, which will be moved through the filter towards the positive DC electrode and be separated from the mixture. The energy of the electrons can be controlled, in this way, to be at the optimum level to form negative ions.

Figure 7:
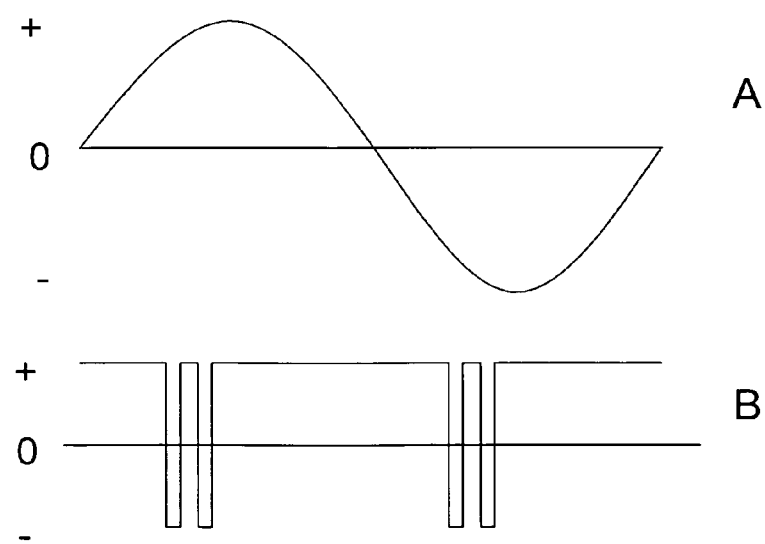
FIG. 7 is two alternate waveforms of the electric fields.
Figure 8:
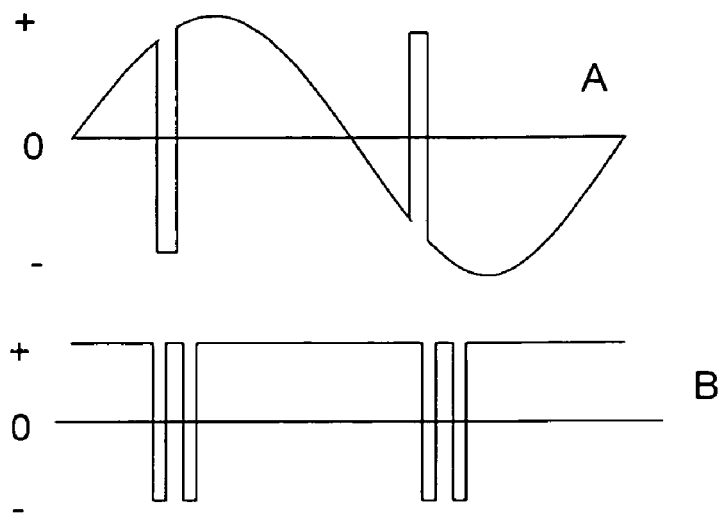
FIG. 8 is two alternate waveforms of the electric fields
Figure 9:
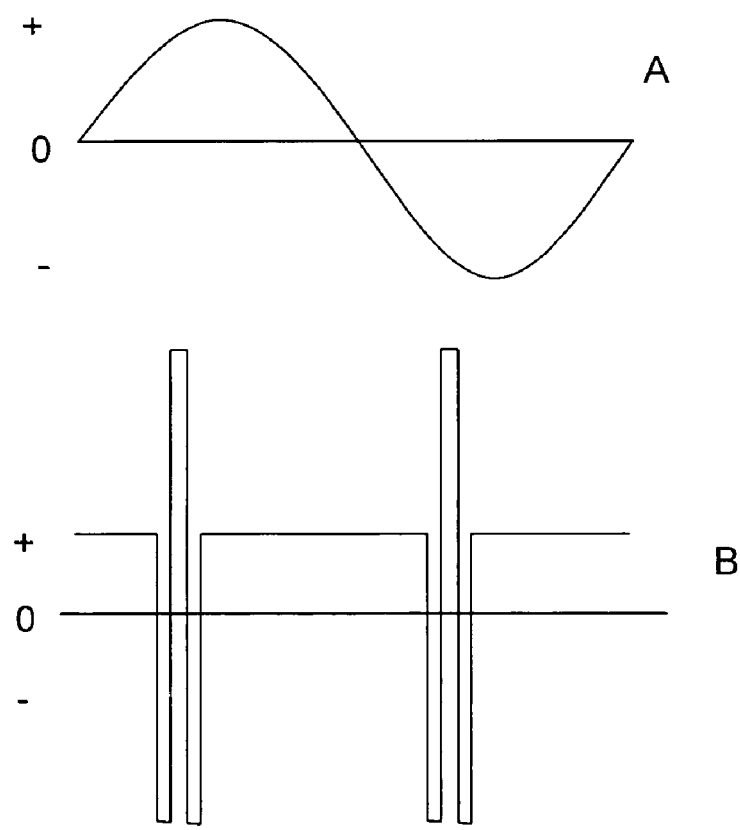
FIG. 9 is two alternate waveforms of the electric fields

The DC field electrodes can have AC cycles synchronized with the AC voltage source frequency as shown in FIGS. 7, 8, and 9 as the B waveforms. The A waveforms are possible AC waveforms. These are examples of the transverse DC field changing polarity during a typical dielectric discharge produced by the AC field. Also shown is the AC field changing direction during a discharge. The fast moving electrons are forced to change direction and collide with neutral electronegative molecules to form negative ions. The examples in FIGS. 7, 8, and 9 show an AC sine wave as A, and a DC rectangular wave as B. The shape of the waveforms can also be triangular or square or any repetitive pattern or any combination of these to control the charged particles.

The concentration of ions in each discharge is very low, but they are produced twice, or more, during each cycle and accumulate quickly at high frequencies, so a flow of input gas should be maintained as with an external fan.

As the concentration increases, diffusion also increases, but because the forces produced by the electric field are so high, the accumulation can be 2 orders of magnitude higher than the diffusion flux.

In FIG. 6, the flow of the negative ions from the non thermal discharge area is shown as 3 and the flow of positive ions is shown as 5. These form the final outflows.

To control the diffusion, and maintain separation, filters are used as the ions leave the AC field area. These are shown as 8 in the FIGS. The filters can be mechanical, which use the direction and velocity of the ions to maintain separation after the ions are neutralized at the equalization plates. After they are no longer ions, the electric forces have no effect and the concentration gradient will tend to remix the separated molecules back into the main stream.

The filters can also be membranes, which allow ions with a higher average velocity to pass through in one direction.

The filters can also be ion conducting, or charge conducting membranes, which allow the previously charged molecules to pass in one direction only, because they are located in the DC electric field.

The filters can also be an ion conducting fluid or solid. The filters on each side are designed to pass either a negative ion or a positive ion and are located within the DC field area. The ions can have a transverse velocity in the range of approximately 400 m/sec for certain DC field strengths. These will impinge on the filter and allow them to enter the ion conducting fluid. The DC electric field acts on the ions in the fluid and moves them out the opposite side. The filters act as one way valves or check valves to pass certain charged ions in one direction only. The space on the opposite side of the filter will maintain a very high concentration of each species of ions. In some cases, filters will not be necessary on both sides as when the non electronegative gas is not considered worth recovering.

The means to neutralize the ionized gases can be provided by the ion equalization plates or grids, located on either side of the device, which are shown as 10. Included with 10, are the electrical connections between the plates or grids, shown as dashed lines and are outside the housing 1. After the ions pass through the filter, they are accelerated towards the DC electrodes and deposit their charges on the plates. Because the plates accumulate charges of opposite polarity, and because they are electrically connected, the neutralizing current flows between them. A second DC voltage source can be employed to facilitate the flow.

The neutralizing current is derived from the original electron avalanche and ions and may not pass through an external excitation circuit. It flows from the molecules and back to the molecules in an energy efficient circuit.

In this way, this process and device, separate fluids and produces high purity concentrations with low energy input.

The relative size and construction of the individual components is illustrated for the sake of understanding the operation of the separator and for clarity of the description. It should be understood by those skilled in the art that the foregoing and various other changes, omissions, and additions in the form and detail thereof may be made therein without departing from the spirit and scope of the invention.

What I claim is:

1. A process of separating electronegative molecules from non electronegative molecules in a mixture of molecules comprising providing a first electric field established by an alternating electrical potential in a volume to enclose said mixture of molecules, bringing said mixture of molecules into said first electric field to produce a non thermal plasma of said mixture of molecules, by said first electric field accelerating initial electrons near the negative side towards the positive side of said first electric field, said electrons accelerated by said first electric field colliding with said mixture of molecules located within said first electric field producing positive ions and more electrons to collide with more molecules, over many iterations of said alternating electrical potential producing an avalanche of electrons and an equal number of positive ions, said avalanche of electrons producing negative ions of said electronegative molecules when they are added to said electronegative molecules, providing a second electric field by an average direct current electrical potential, which is in a transverse direction to said first electric field and is enclosed in the same volume as a volume of said first electric field, which attracts negative ions in one direction and positive ions in the opposite direction, and spatially separating the negative and positive ions.

2. A process as claimed in claim 1, wherein the electronegative molecules in said mixture of molecules is oxygen.

3. A process as claimed in claim 1, wherein some of the negative ions release their excess electron charges after they are spatially separated from the positive ions and those electron charges then neutralize the positive ions to form neutral molecules which are spatially separated.

4. A process as claimed in claim 1, wherein a filter allows spatially separated ions to pass through it more easily than neutral molecules.

5. An electric field oxygen separating device comprising:

an elongate outer housing which contains a flow of a mixture of electronegative and non electronegative molecules, an alternating electric potential source which is connected to a first set of electrodes which produce an electric field within a volume of said elongate outer housing, said electric field at high voltage to produce a volume of non thermal discharge within a portion of said elongate outer housing, an average direct current potential source which is connected to a second set of electrodes which produce an electric field that is transverse or across said electric field produced by said first set of electrodes, means to control both electric fields so said non thermal discharge field ionizes part of said mixture of electronegative and non electronegative molecules into positive and negative ions which then migrate in opposite directions towards said second set of electrodes to produce spatial separation of said positive and negative ions and charges.

6. An electric field oxygen separating device of claim 5 wherein a set of conducting equalization plates or grids are disposed in the path of the separated positive and negative ions, means to electrically interconnect said plates which allows said separated positive and negative ions to deposit their electric charges on said plates and revert to uncharged neutral molecules and produce the flow of said electric charges between said equalization plates.

7. An electric field oxygen separating device of claim 5 wherein a filter is disposed in the path of the separated ions and allows ions to pass through said filter more easily than uncharged molecules.

* * * * *